US011789613B2

(12) United States Patent
Ito et al.

(10) Patent No.: US 11,789,613 B2
(45) Date of Patent: Oct. 17, 2023

(54) STORAGE SYSTEM AND DATA PROCESSING METHOD

(71) Applicant: Hitachi, Ltd., Tokyo (JP)

(72) Inventors: Shintaro Ito, Tokyo (JP); Sachie Tajima, Tokyo (JP); Takahiro Yamamoto, Tokyo (JP); Masakuni Agetsuma, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 17/690,191

(22) Filed: Mar. 9, 2022

(65) Prior Publication Data

US 2022/0404977 A1    Dec. 22, 2022

(30) Foreign Application Priority Data

Jun. 16, 2021 (JP) .................................. 2021-100322

(51) Int. Cl.
*G06F 3/06* (2006.01)
*G06F 11/20* (2006.01)

(52) U.S. Cl.
CPC ............ *G06F 3/0611* (2013.01); *G06F 3/065* (2013.01); *G06F 3/0656* (2013.01); *G06F 3/0683* (2013.01); *G06F 11/2082* (2013.01)

(58) Field of Classification Search
CPC ...... G06F 3/0611; G06F 3/065; G06F 3/0656; G06F 3/0683; G06F 11/2082
USPC ......................................................... 711/162
See application file for complete search history.

(56) References Cited

U.S. PATENT DOCUMENTS

| 8,868,954 | B1 * | 10/2014 | Balakrsihnan ............ G06F 1/20 |
| | | | 713/324 |
| 10,083,100 | B1 * | 9/2018 | Agetsuma .......... G06F 11/3055 |
| 10,229,021 | B1 | 3/2019 | Iwamitsu et al. |
| 2017/0083417 | A1 * | 3/2017 | Kawaguchi ......... G06F 11/1658 |
| 2018/0232312 | A1 | 8/2018 | Hidekazu et al. |

(Continued)

FOREIGN PATENT DOCUMENTS

| JP | 2018-132964 A | 8/2018 |
| JP | 2019101703 A | 6/2019 |

(Continued)

OTHER PUBLICATIONS

Japanese Office Action received in corresponding Japanese Application No. 2021-100322 dated Jul. 4, 2023.

*Primary Examiner* — Than Nguyen
(74) *Attorney, Agent, or Firm* — MATTINGLY & MALUR, PC

(57) ABSTRACT

In a storage system in which a plurality of pieces of control software constituting a redundancy group are distributedly arranged in a plurality of storage nodes, control software in an active state out of the plurality of pieces of control software constituting the redundancy group receives a write request from a higher-level device. The control software in the active state writes data related to the write request by mirroring into a cache memory of a storage node in which the control software in the active state is arranged and a cache memory of a storage node in which control software in an inactive state belonging to the same redundancy group is arranged. The control software in the active state sends a write completion response to the higher-level device, and redundantly stores the data written in the cache memories in a storage device.

8 Claims, 16 Drawing Sheets

(56) References Cited

U.S. PATENT DOCUMENTS

2019/0310925 A1* 10/2019 Yoshida .................. G06F 3/065
2020/0034263 A1    1/2020 Hiroto et al.

FOREIGN PATENT DOCUMENTS

JP    2020-191100 A    11/2020
WO   2019/049224 A1    3/2019

* cited by examiner

FIG. 8

| CACHE ADDRESS | LOGICAL VOLUME NUMBER | LOGICAL VOLUME ADDRESS | ATTRIBUTE |
|---|---|---|---|
| 0 | 1 | 1024 | Dirty |
| 1 | - | - | - |
| 2 | 32 | 50876 | Dirty |
| 3 | 1 | 4 | Clean |
| ... | ... | ... | |

FIG. 9

| STORAGE CONTROLLER GROUP NUMBER | ACTIVE ARRANGEMENT DESTINATION NODE NUMBER | STANDBY ARRANGEMENT DESTINATION NODE NUMBER | |
|---|---|---|---|
| 1 | 1 | 2 | |
| 2 | 2 | 3 | |
| 3 | 3 | 4 | |
| 4 | 4 | 5 | |
| ... | ... | | |

STORAGE SYSTEM AND DATA PROCESSING METHOD

CROSS-REFERENCE TO RELATED APPLICATION

The present application claims priority from Japanese application JP 2021-100322, filed on Jun. 16, 2021, the contents of which is hereby incorporated by reference into this application.

BACKGROUND OF THE INVENTION

1. Field of the Invention

The present invention relates to a storage system and a data processing method.

2. Description of the Related Art

Conventionally, a technology for constructing a storage system by software (software defined storage: SDS) has been proposed.

For example, JP 2019-101703 A describes as follows. "In a storage system including a plurality of storage nodes, the storage node includes: one or more storage devices which respectively provide a storage area; and one or more control software which read/write requested data from/into the corresponding storage device according to a request from a higher-level device. Each of the control software retains predetermined configuration information required for reading/writing requested data from/into the corresponding storage device according to a request from the higher-level device. A plurality of the control software are managed as a redundancy group, and the configuration information retained in each of the control software belonging to the same redundancy group is synchronously updated. The plurality of control software configuring the redundancy group are each deployed in respectively different storage nodes so as to distribute a load of each of the storage nodes."

SUMMARY OF THE INVENTION

According to the technology described in JP 2019-101703 A, it is possible to construct the storage system capable of continuing reading and writing even when a node failure occurs in the SDS. On the other hand, it is necessary to make data redundant by writing the data to drives of the plurality of storage nodes, and thus, it takes a lot of time until a response of a write success is sent to a host. The present invention aims to propose a storage system or the like that can shorten a response time to a host in such a system.

In order to solve such a problem, in the present invention, a storage system includes: a plurality of storage nodes; and one or a plurality of storage devices each providing a storage area. The storage node includes one or a plurality of pieces of control software reading and writing requested data from and to a corresponding storage device out of the storage devices in response to a request from a higher-level device, and a cache memory that retains cache data related to the reading and writing. A plurality of pieces of the control software form each of redundancy groups, and pieces of the control software belonging to an identical redundancy group out of the redundancy groups are arranged in the storage nodes different from each other. Control software in an active state, which processes the request from the higher-level device, out of the plurality of pieces of control software forming the redundancy group writes data related to a write request by mirroring into a cache memory of a storage node in which the control software in the active state is arranged and a cache memory of a storage node in which control software in an inactive state belonging to the identical redundancy group is arranged when the write request is received, sends a write completion response to the higher-level device, and redundantly stores the data written in the cache memories in the storage device.

In addition, provided is a data processing method in a storage system in which a plurality of pieces of control software constituting a redundancy group are distributedly arranged in a plurality of storage nodes. The data processing method includes: receiving a write request from a higher-level device by control software in an active state out of the plurality of pieces of control software constituting the redundancy group; writing, by the control software in the active state, data related to the write request by mirroring into a cache memory of a storage node in which the control software in the active state is arranged and a cache memory of a storage node in which control software in an inactive state belonging to the same redundancy group is arranged; and sending, by the control software in the active state, a write completion response to the higher-level device, and redundantly storing the data written in the cache memories in a storage device.

According to the present invention, host response performance can be improved. Other objects, configurations, and effects which have not been described above become apparent from embodiments to be described hereinafter.

BRIEF DESCRIPTION OF THE DRAWINGS

FIG. 8 is a diagram illustrating an example of a cache directory;
FIG. 9 is an example of a storage controller management table.

DESCRIPTION OF THE PREFERRED EMBODIMENTS

Hereinafter, one embodiment of the present invention will be described in detail with reference to the drawings. The present embodiment relates to, for example, a storage system including a plurality of storage nodes on which one or a plurality of SDSs are mounted.

Figure 1:
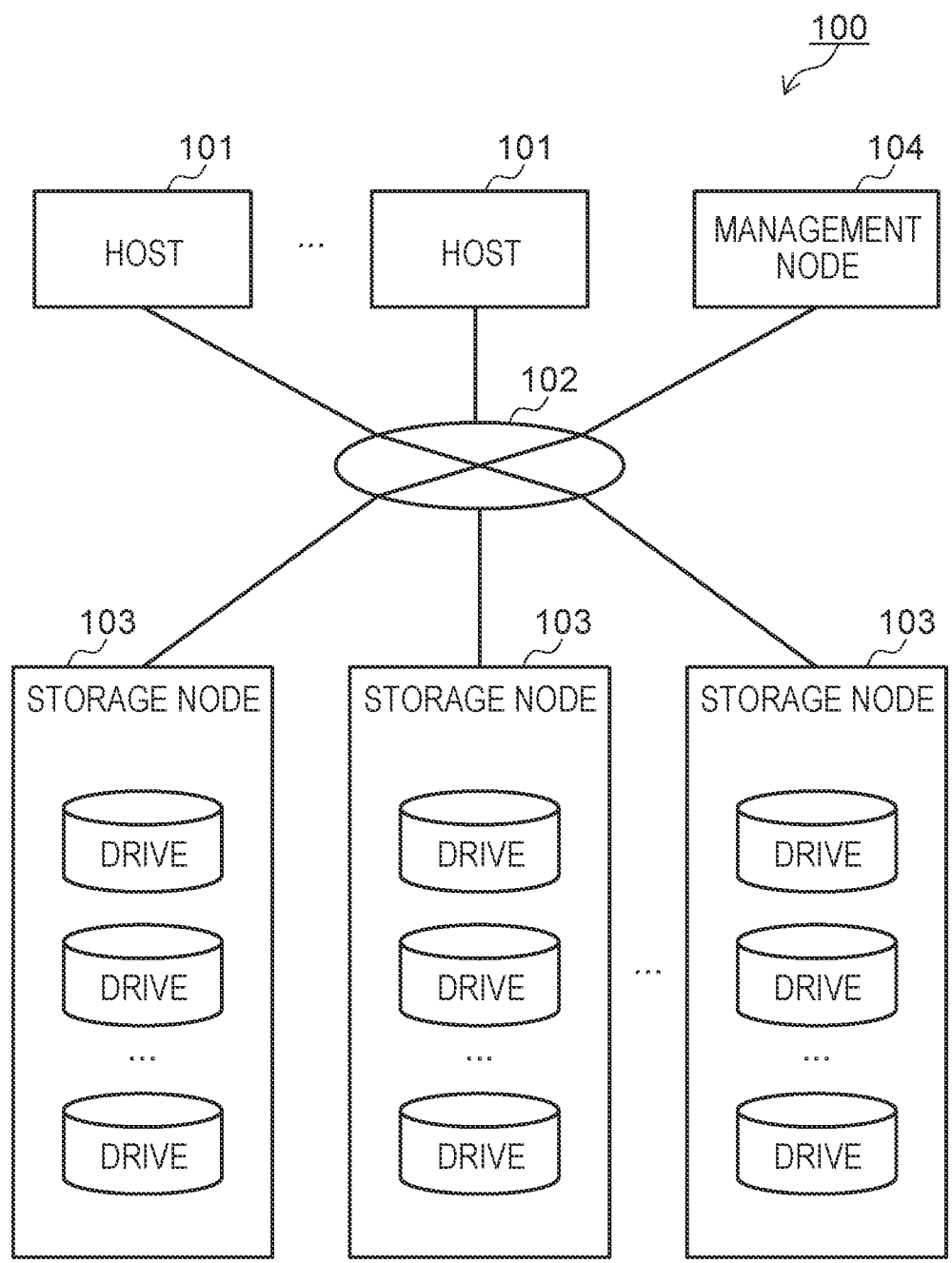
FIG. 1 is a system configuration diagram illustrating a whole storage system according to a first embodiment.

First Embodiment (1) First Embodiment (1-1) Configuration of Storage System According to Present Embodiment FIG. 1 is a system configuration diagram illustrating a whole storage system according to a first embodiment.

A storage system 100 illustrated in FIG. 1 includes, for example, a plurality of hosts 101, a plurality of storage nodes 103, and a management node 104. The host 101, the storage node 103, and the management node 104 are connected to each other via a network 102 configured using a fibre channel, Ethernet (registered trademark), a local area network (LAN), and the like.

The host 101 is a general-purpose computer device that transmits a read request or a write request (hereinafter, as appropriate, collectively referred to as an input/output (I/O) request) to the storage node 103 in response to a user's operation or a request from a mounted application program. Note that the host 101 may be a virtual computer device such as a virtual machine.

The storage node 103 is a computer device that provides a storage area for reading and writing data to the host 101. The storage node 103 is, for example, a general-purpose server device.

The management node 104 is a computer device used by a system administrator to manage the entire storage system 100. The management node 104 manages the plurality of storage nodes 103 as a group called a "cluster". Although FIG. 1 illustrates an example in which only one cluster is provided, a plurality of clusters may be provided in the storage system 100.

Figure 2:
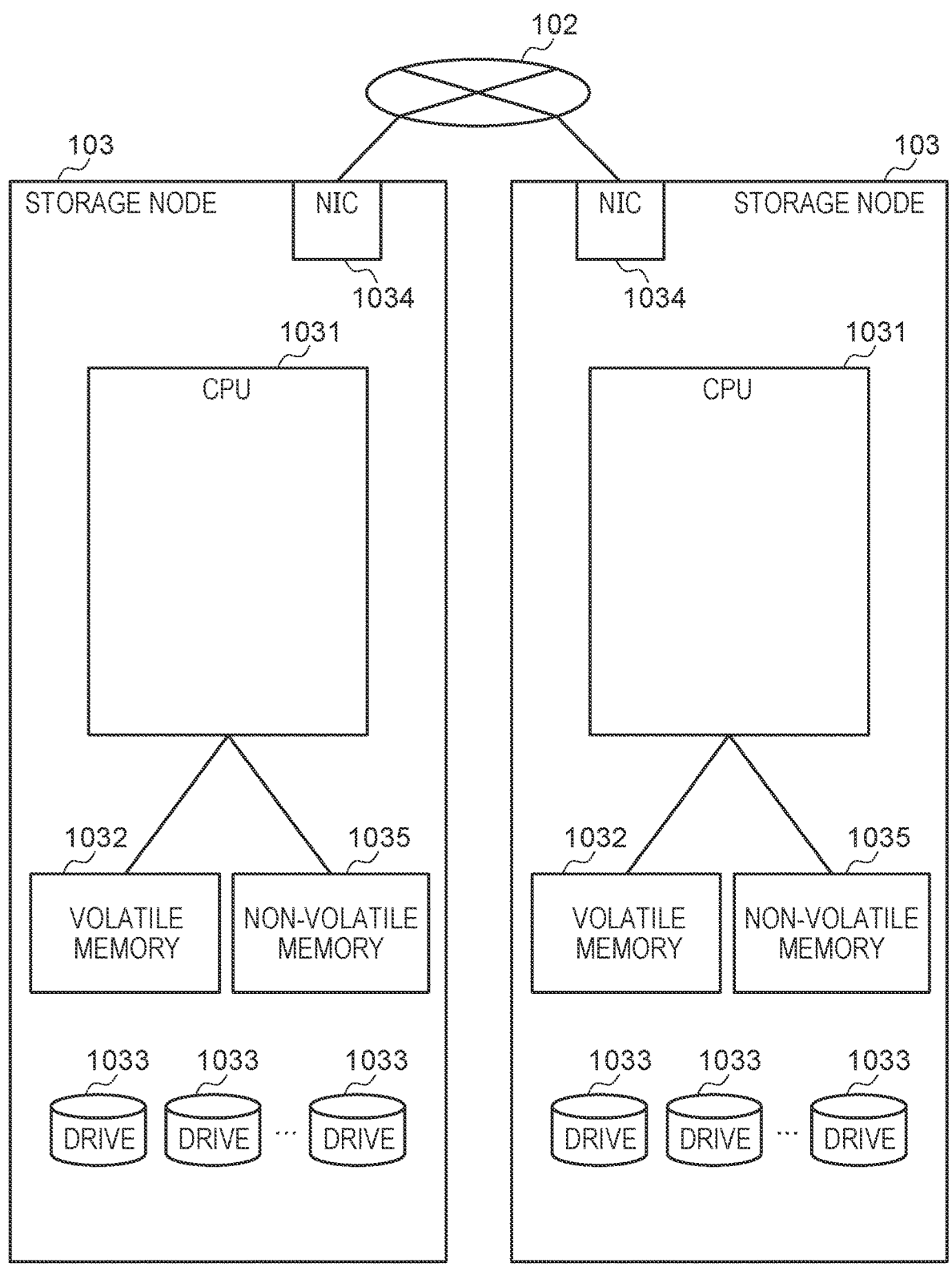
FIG. 2 is a diagram illustrating an example of a physical configuration of a storage node.

FIG. 2 is a diagram illustrating an example of a physical configuration of the storage node 103.

The storage node 103 includes a central processing unit (CPU) 1031, a volatile memory 1032, a non-volatile memory 1035, a plurality of drives 1033, and a network interface card (NIC) 1034.

The CPU 1031 is a processor that controls the overall operation of the storage node. The volatile memory 1032 is configured using a volatile semiconductor memory such as a static random access memory (RAM) (SRAM) and a dynamic RAM (DRAM). The non-volatile memory 1035 is configured using a non-volatile RAM (NVRAM), a NAND flash memory, and the like. The volatile memory 1032 and the non-volatile memory 1035 are used to temporarily retain various programs and necessary data. When the CPU 1031 executes the programs stored in the volatile memory 1032 and the non-volatile memory 1035, various processes as a whole of the storage node 103, which will be described later, are executed.

The drive 1033 is configured using one or a plurality of types of large-capacity non-volatile storage devices such as a solid state drive (SSD), a serial attached small computer system interface (serial attached SCSI (SAS)) hard disk drive, and a serial advanced technology attachment (serial ATA (SATA)) hard disk drive. The drive 1033 provides a physical storage area for reading or writing data in response to an I/O request from the host 101.

The NIC 1034 is an interface configured to allow the storage node 103 to communicate with the host 101, the other storage node 103, or the management node 104 via the network 102. The NIC 1034 is configured using, for example, an NIC, an FC card, or the like. The NIC 1034 performs protocol control during communication with the host 101, the other storage node 103, or the management node 104.

Figure 3:
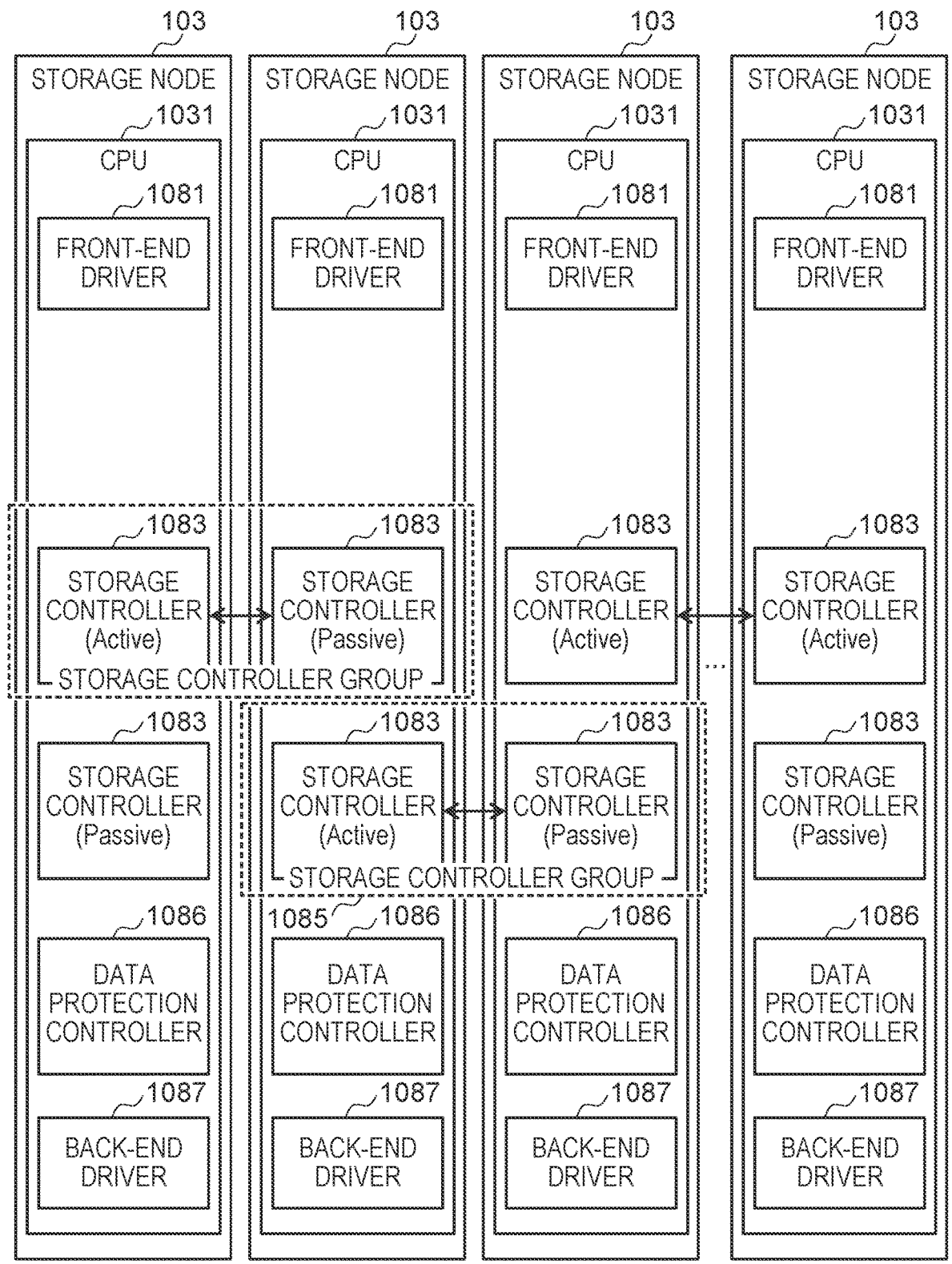
FIG. 3 is a diagram illustrating an example of a logical configuration of the storage node.

FIG. 3 is a diagram illustrating an example of a logical configuration of the storage node 103.

The storage node 103 includes a front-end driver 1081, a back-end driver 1087, one or a plurality of storage controllers 1083, and a data protection controller 1086.

The front-end driver 1081 is software that functions to control the NIC 1034 and to provide an abstract interface to the CPU 1031 during the communication with the host 101, the other storage node 103, or the management node 104 for the storage controller 1083.

The back-end driver 1087 is software that functions to control each of the drives 1033 in the own storage node 103 and to provide an abstract interface during the communication with each of the drives 1033 to the CPU 1031.

The storage controller 1083 is software that functions as an SDS controller. The storage controller 1083 receives an I/O request from the host 101, and issues an I/O command in response to the I/O request to the data protection controller 1086. In addition, the storage controller 1083 has a logical volume configuration function. The logical volume configuration function associates a logical chunk configured by the data protection controller with a logical volume provided to the host. For example, a straight mapping method (in which a logical chunk and a logical volume are associated one to one, and an address of the logical chunk and an address of the logical volume are the same) may be used, or a virtual volume function (thin provisioning) method (in which a logical volume and a logical chunk are divided into small areas (pages) and addresses of the logical volume and the logical chunk are associated with each other in units of pages) may be adopted.

In the present embodiment, each of the storage controllers 1083 mounted on the storage node 103 is managed as a pair forming a redundant configuration together with the other storage controller 1083 arranged on the other storage node 103. Hereinafter, this pair is referred to as a storage controller group 1085.

Note that FIG. 3 illustrates a case where one storage controller group 1085 includes two storage controllers 1083. Hereinafter, the description will be made assuming that the storage controller group 1085 includes the two storage controllers 1083, but one redundant configuration may be configured by the three or more storage controllers 1083.

In the storage controller group 1085, one storage controller 1083 is set to a state in which an I/O request from the host 101 is receivable (a state of an active system, hereinafter referred to as an active mode). In addition, in the storage controller group 1085, the other storage controller 1083 is set to a state in which the I/O request from the host 101 is not receivable (a state of a standby system, hereinafter referred to as a standby mode).

In the storage controller group 1085, when a failure occurs in the storage controller 1083 set to the active mode (hereinafter referred to as an active storage controller) or the storage node 103 where the active storage controller is arranged, a state of the storage controller 1083 (hereinafter referred to as a standby storage controller) that has been set to the standby mode until then is switched to the active mode. As a result, when the active storage controller fails to operate, the standby storage controller can take over the I/O processing which has been executed by the active storage controller.

The data protection controller 1086 is software that functions to allocate a physical storage area provided by the drive 1033 in the own storage node 103 or the other storage node 103 to each of the storage controller groups 1085, and to read or write specified data from or to the corresponding drive 1033 in response to the above I/O command given by the storage controller 1083.

In this case, when allocating the physical storage area provided by the drive 1033 in the other storage node 103 to the storage controller group 1085, the data protection controller 1086 exchanges data with the data protection controller 1086 via the network 102 in cooperation with the data protection controller 1086 mounted on the other storage node 103, thereby reading or writing the data from or to the storage area in response to the I/O command given by the active storage controller of the storage controller group 1085.

Figure 4:
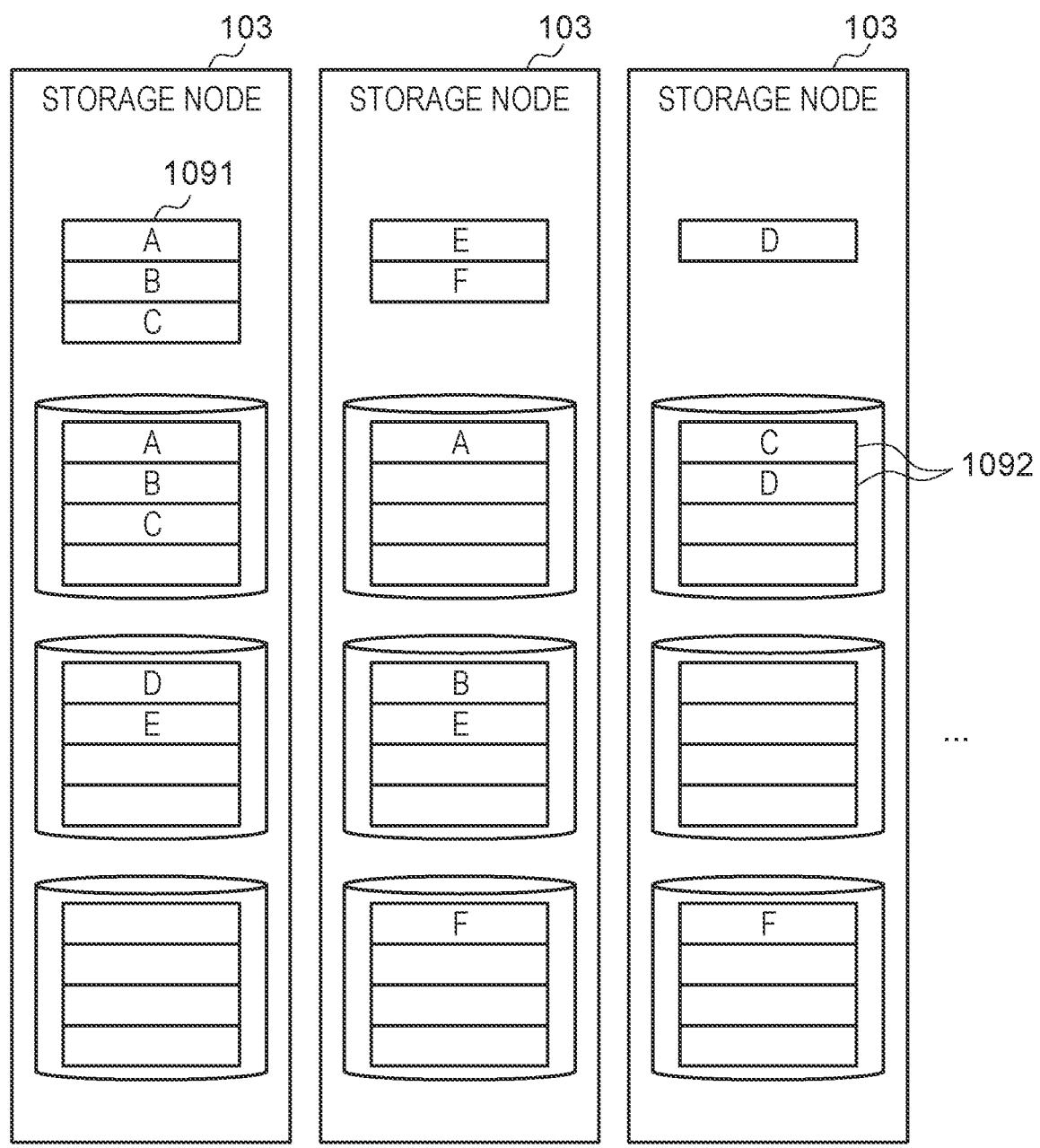
FIG. 4 is a diagram illustrating an example of a storage area managed by a data protection controller.

FIG. 4 is a diagram illustrating an example of the storage area managed by the data protection controller 1086.

The data protection controller 1086 manages physical storage areas 1092 respectively provided by the drives 1033 in the respective storage node 103 in the state of being divided into physical storage areas (hereinafter referred to as physical chunks) having a predetermined size as illustrated in FIG. 4.

In addition, the data protection controller 1086 associates dedicated pools respectively with the storage controller groups 1085, appropriately allocates logical storage areas 1091 (hereinafter referred to as logical chunks), which are logical storage areas each having the same size as the physical chunk, to these pools, and associates one or a plurality of physical chunks with the logical chunk.

Further, one or a plurality of virtual logical volumes (hereinafter, referred to as virtual volume or volume) are defined on the pool of each of the storage controller groups 1085, and these virtual volumes are provided to the host 101 as host volumes.

When writing data to such a virtual volume, the host 101 transmits a write request, which specifies an identifier (logical number unit (LUN)) of a virtual volume to which the data is written (hereinafter referred to as a write target volume) and a storage area to which the data is written in the write target volume (hereinafter, this is referred to as a write destination storage area), to any of the storage nodes 103 in the corresponding cluster.

The front-end driver 1081 of the storage node 103 having received the write request transfers the write request and write target data (hereinafter referred to as write data), transmitted from the host 101 together with the write request, to the active storage controller of the storage controller group 1085 associated with the write target volume specified in the received write request via the pool or the front-end driver 1081 of each of the storage nodes 103 in which the standby storage controller is arranged.

In addition, the front-end driver 1081 of the storage node 103 having received these write request and write data pass these write request and write data to the storage controllers 1083 of the storage controller group 1085 associated with the write target volume specified in the write request via the pool.

The active storage controller of the storage controllers 1083 to which the write request and the write data have been passed allocates a storage area (hereinafter referred to as a logical area) to the write destination storage area in the write target volume as necessary from the logical chunk constituting the pool associated with the write target volume.

In addition, the active storage controller generates an I/O command (write command), obtained by converting an address of the write destination storage area in the write target volume specified in the write request to a chunk number of the logical chunk from which a logical area has been allocated to the write destination storage area and an offset position of the logical area, and transmits the generated I/O command to the data protection controller 1086 in the own storage node 103 together with the write data.

When receiving the I/O command and the write data, the data protection controller 1086 stores the data in each of the storage areas at the offset position in each of the drives 1033 that provides each of the physical chunks associated with the logical chunk specified by the I/O command.

In this manner, the data from the host 101 is redundantly stored in the plurality of physical chunks associated with the corresponding logical chunk in the storage system 100. Therefore, the number of the physical chunks allocated to the logical chunk is determined by a setting content of a redundancy method in the storage system 100.

For example, in a setting in which data is stored by mirroring, two physical chunks are associated with one logical chunk. In a setting in which data is multiplexed to be triplicated or more and stored, a setting in which redundant data is created from data and stored as in Erasure-Coding (EC), or the like, three or more necessary physical chunks are associated with one logical chunk.

Meanwhile, when reading data from a virtual volume, the host 101 transmits a read request, which specifies a LUN of the virtual volume (hereinafter referred to as a read target volume) and a storage area as a read destination of the data in the read target volume (hereinafter referred to as a read destination area), to any of the storage nodes 103 in the cluster including the read target volume.

The front-end driver 1081 of the storage node 103 having received the read request transfers the read request to the active storage controller of the storage controller group 1085 associated with the read target volume specified in the received read request via the pool or each of the storage nodes 103 in which the standby storage controller is arranged.

In addition, the front-end driver 1081 of the storage node 103 having received the read request passes the read request to the storage controllers 1083 of the storage controller group 1085 associated with the read target volume specified in the read request via the pool.

The active storage controller of the storage controllers 1083 to which the read request has been passed generates an I/O command (read command), obtained by converting an address of the read destination area in the read target volume to a chunk number of a logical chunk from which a logical area has been allocated to the read destination area and an offset position of the logical area, and transmits the generated I/O command to the data protection controller 1086 in the own storage node 103.

When receiving the I/O command, the data protection controller 1086 reads data from a storage area at the offset position specified by the I/O command in the physical chunk set to a "master" among the respective physical chunks associated with the logical chunk specified by the I/O command, and transfers the read data as read data to the active storage controller which is a transmission source of the I/O command. Thereafter, the read data is transferred by the active storage controller to the host 101, which is a transmission source of the read request, via the network 102.

(1-2) Allocation of Physical Chunk to Logical Chunk

In the case of adopting the redundancy method of associating one logical chunk with a plurality of physical chunks and storing data in each of these physical chunks to make data redundant as described above, it is desirable to select the plurality of physical chunks associated with one logical chunk from physical chunks respectively provided by the different storage nodes 103 from the viewpoint of data protection. This is because data lost occurs when it is difficult for the storage node 103 to read data due to a failure or the like, for example, if a plurality of physical chunks in the same storage node 103 are associated with one logical chunk.

Therefore, in the storage system 100, when the data protection controller 1086 allocates a logical chunk to the storage controller group 1085 and associates a plurality of physical chunks with the logical chunk, these plurality of physical chunks are selected from physical chunks provided by the plurality of storage nodes 103 which are different from each other.

(1-3) Processing of Write Command

Figure 5:
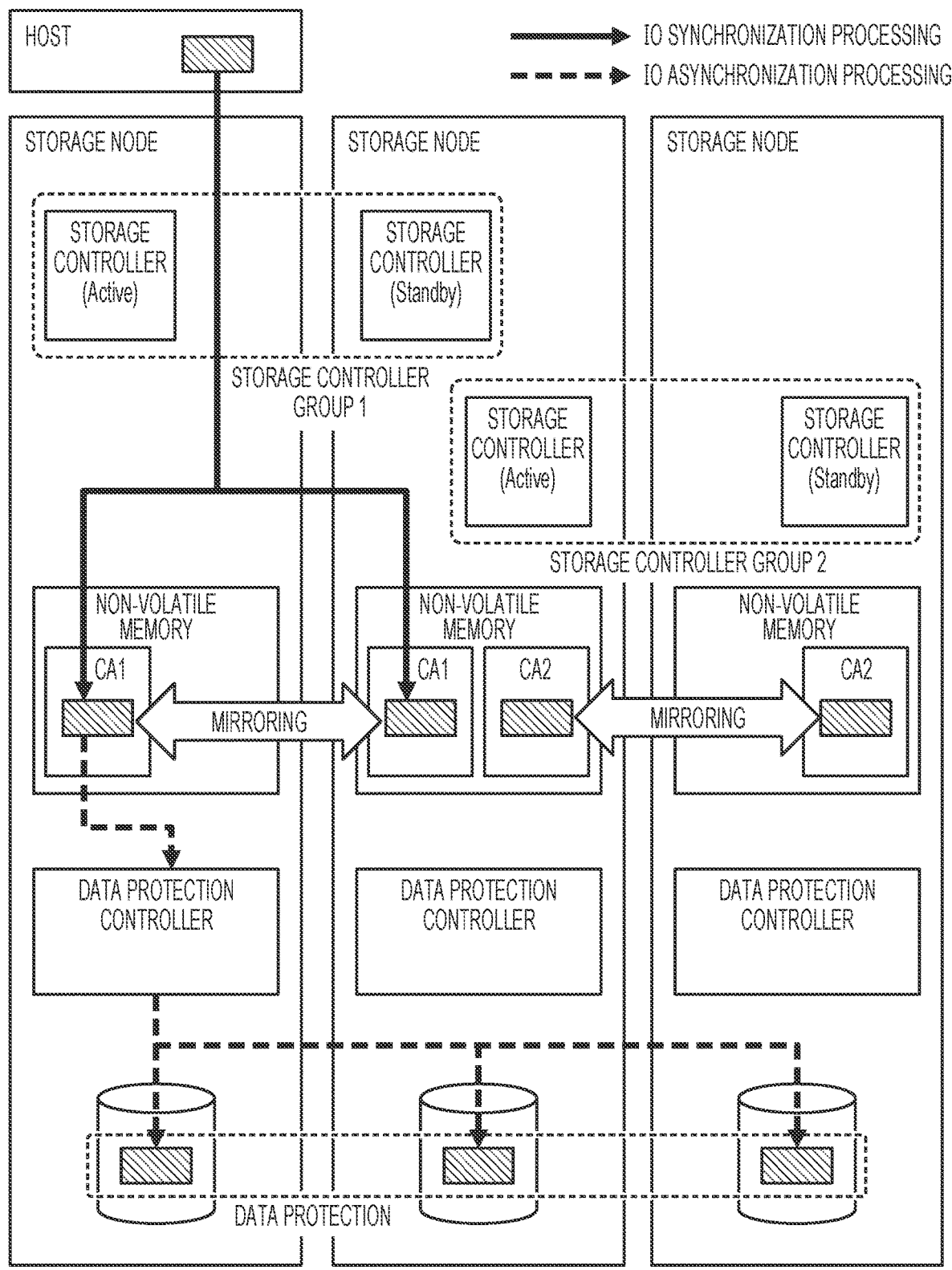
FIG. 5 is a diagram illustrating an outline of the present invention.

FIG. 5 is a diagram illustrating an outline of the present invention. Arrows in the drawing indicate a data flow from a host to a write IC and whether the data is processed in host IC synchronization. The host IC synchronization means that the processing is performed before sending a success response to a write command of the host. On the contrary, host IO asynchronization means that the processing is performed after sending the success response to the write command of the host.

Data written from the host is passed to an active storage controller via a front-end driver of each storage node (front-end driver and back-end driver are omitted in the drawing). In this drawing, the data is passed to an active storage controller that belongs to Storage controller group 1. The storage controller executes write processing, stores data, written in Cache areas 1 on corresponding non-volatile memories arranged in a storage controller in the active mode belonging to Storage controller group 1 and a node to which a storage controller in the standby mode belongs, by mirroring, and sends the success response to the write command to the host.

After sending the success response to the host, the storage controller calls asynchronous destaging processing of data protection control and passes the data on the cache areas to a data protection controller. The data protection controller stores data redundantly between nodes using mirroring or EC.

(1-4) Memory and Data

Figure 6:
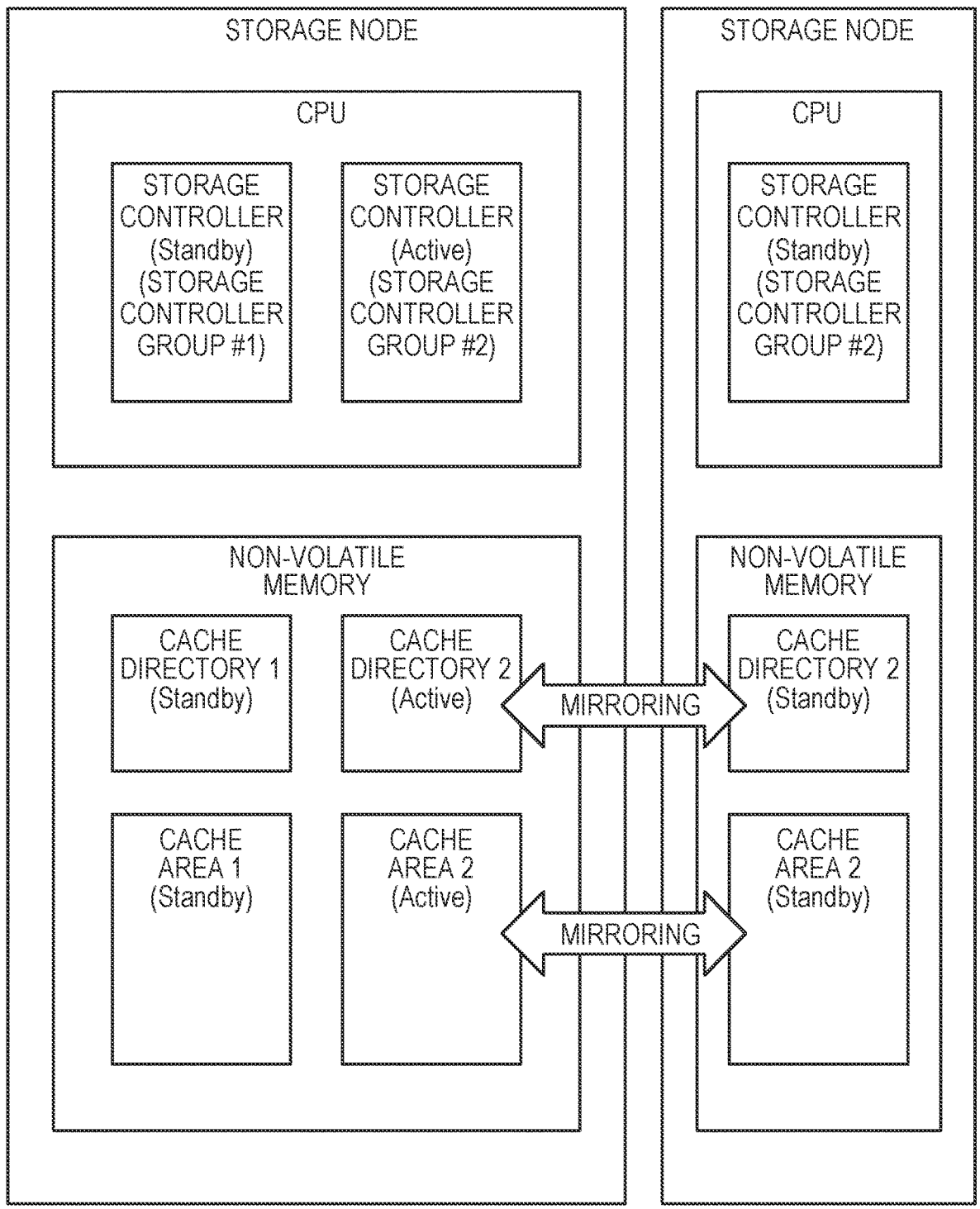
FIG. 6 is an example of a configuration diagram of a non-volatile memory.

FIG. 6 is an example of a configuration diagram of a non-volatile memory. A cache area and a cache directory are arranged in the non-volatile memory. The cache area stores data which has been written from a host and data to be read to the host. The cache directory is information for managing the cache area, and records an address of a corresponding logical volume for each subdivided partial area (referred to as a cache segment) of the cache area. Details will be described with reference to FIG. 8.

The same number of cache directories and cache areas exist in the form of corresponding to the storage controllers 1083 arranged in the same node. For example, a cache directory corresponding to Storage controller group 1 is Cache directory 1, a cache area corresponding to Storage controller group 1 is Cache area 1, a cache directory corresponding to Storage controller group 2 is Cache directory 2, and a cache area corresponding to Storage controller group 2 is Cache area 2.

The same cache data is stored in the cache areas respectively corresponding to the storage controllers belonging to the same storage controller group, and the same information is also stored in the cache directories that manages the cache areas (by mirroring). This mirroring processing is performed in write processing to be described later.

Figure 7:
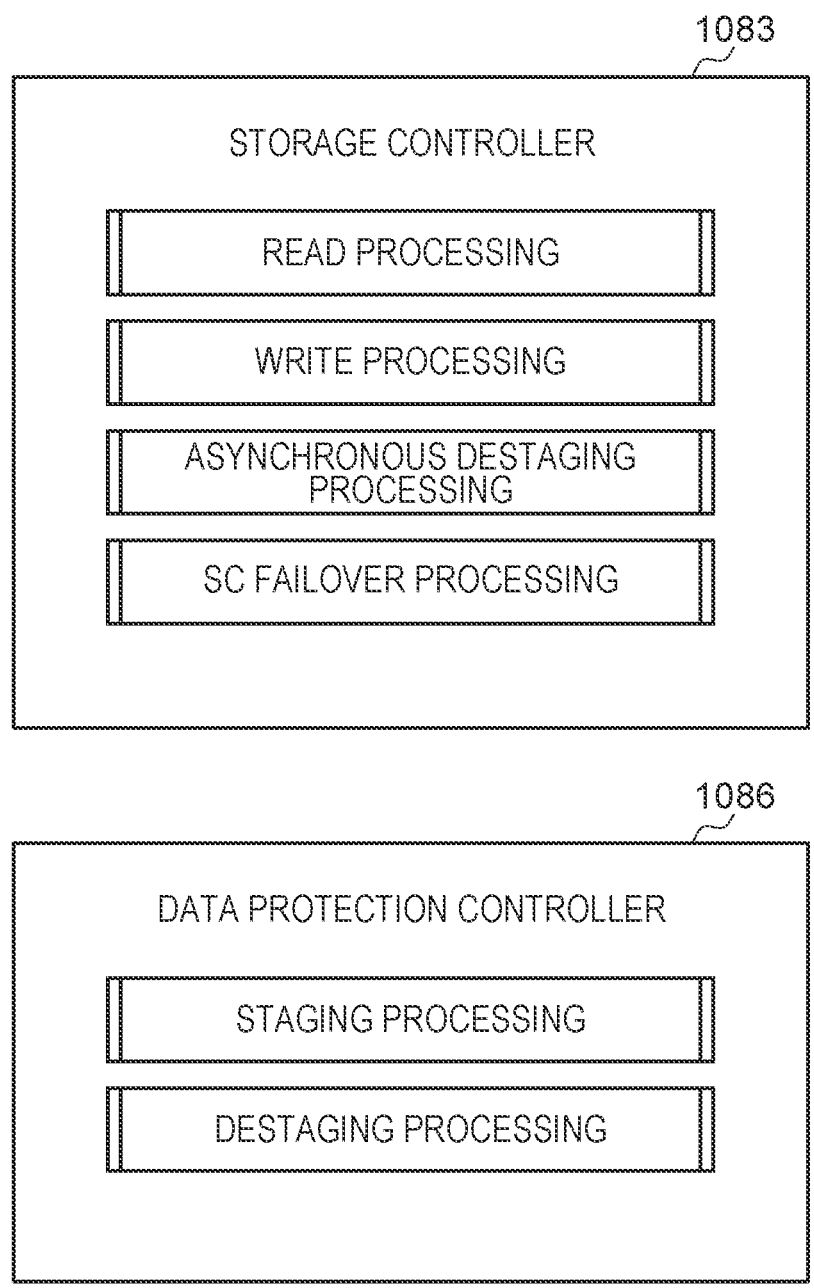
FIG. 7 is a diagram illustrating an example of a software module structure.

FIG. 7 is a diagram illustrating an example of a software module structure of the storage controller 1083 and the data protection controller 1086.

The storage controller 1083 executes read processing, write processing, asynchronous destaging processing, and SC failover processing.

The read processing is a process of reading read target data from a cache area or a drive in response to a read command received from a front-end driver. The reading from the drive is called staging, and is performed by calling staging processing of the data protection controller.

The write processing is a process of writing write target data to a cache area or a drive in response to a write command received from the front-end driver. The writing to the drive is called destaging, and is performed by calling destaging processing of the data protection controller.

The asynchronous destaging processing is a process of writing data from a cache area to a drive.

The SC failover processing is executed when a failure has occurred in a storage node in the system, and is a process of switching a storage controller in a storage controller group in the standby mode to the active mode to take over a configuration of a storage controller in the active mode, which has been executed in the storage node where the failure has occurred, and a cache area.

The data protection controller 1086 includes the staging processing and destaging processing. Details of each processing will be described later.

Hereinafter, control information will be described. Tables illustrated in FIGS. 8 to 9 are examples of the control information.

FIG. 8 is a diagram illustrating an example of a cache directory. The cache directory is management information of an area (cache segment) obtained by subdividing a cache area, and has an entry corresponding to each cache segment.

Each entry has a cache address, a logical volume number, a logical volume address, and an attribute entry. The cache address indicates an address on a memory of a cache segment to which each entry corresponds, and the logical volume number and the logical volume address indicate any address of any logical volume to which data stored in the cache segment belongs. If no data is stored in the cache segment, "–" indicating the absence of a value is stored. If data is stored in the cache segment, the attribute field has a value of "Dirty" or "Clean". "Dirty" indicates that the data has not yet been destaged and has not been written to a drive, and "Clean" indicates that the data has been destaged and coincides with a value written to the drive.

FIG. 9 is an example of a storage controller management table. In the present embodiment, the storage controller management table is stored in a volatile memory, but may be stored in a non-volatile memory, may be stored in a drive, or may be stored in the drive and then copied such that a copy thereof is retained in the volatile memory.

The storage controller management table has entries corresponding to storage controller groups, respectively, and each entry has entries of a storage controller group number, an active arrangement destination node number, and a standby arrangement destination node number. The storage controller group number retains a number for uniquely identifying each storage controller group, and the active arrangement destination node number and the standby arrangement destination node number indicate which nodes a storage controller in the active mode and a storage controller in the standby mode, which belong to the same group, are arranged in.

(1-5) Description of Operation

Figure 10:
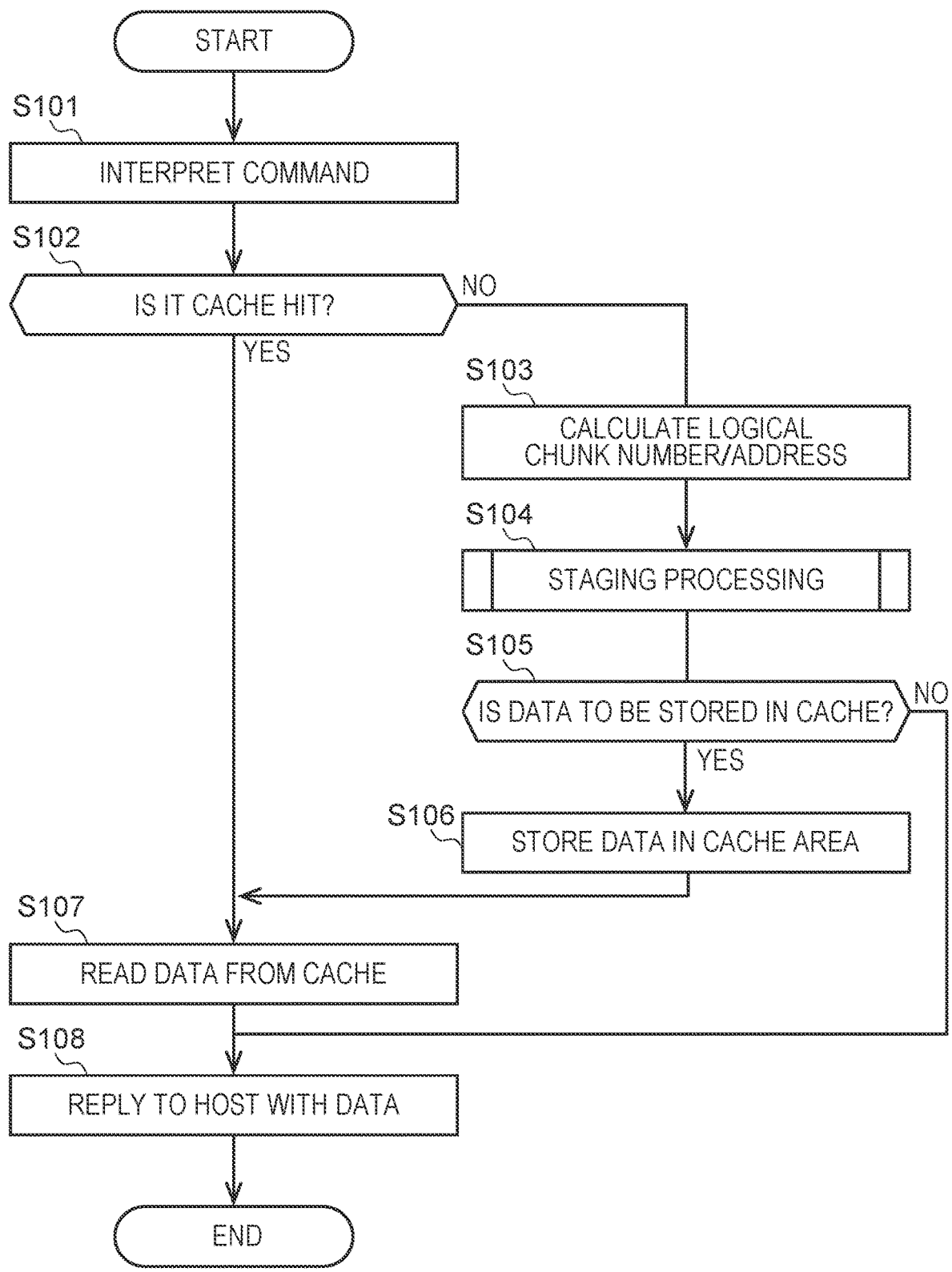
FIG. 10 is a flowchart illustrating read processing.

FIG. 10 is an example of a flowchart illustrating the read processing. The read processing is executed by a storage controller. The storage controller first receives a read command transmitted from a host via a front-end driver, interprets the read command, and obtains a logical volume number and a logical volume address of a read target (step S101). Next, it is determined whether it is a cache hit (step S102). Specifically, the storage controller refers to a cache directory, searches the cache directory for an entry corresponding to the logical volume number and the logical volume address, and refers to a cache address from the entry and proceeds to Yes at the branch to read the data from the cache area (step S107) if there is the entry (hit), and replies to the host with the data (step S108).

If there is no entry corresponding to the logical volume number and the logical volume address in the cache directory (miss), the storage controller proceeds to No at the branch, and calculates a logical chunk number and a logical chunk address corresponding to the logical volume number and address (step S103). The staging processing is called with the logical chunk number and logical chunk address calculated in this manner as parameters (step S104). The staging processing is processing executed by the data protection controller, details thereof will be described in FIG. 14, and the data corresponding to the logical volume number and logical volume address is read out from a drive as a result of the execution. The storage controller determines whether the read data needs to be stored in a cache (step S105), stores the data in the cache if it is determined that the data needs to be stored (step S106), and reads data from the cache similarly to the case of the cache hit (step S107). If it is not determined that the data needs to be stored, a response of the data is sent to the host without being stored in the cache area (step S108).

As a condition of the determination on whether the storage in the cache is necessary, for example, there is a determination condition that a cache hit rate is aggregated and the storage in the cache is not necessary if the cache hit rate is low.

Note that the data stored in the cache in the read processing may be sent to the standby storage for mirroring. A content of a cache memory can be made consistent between the active and the standby by mirroring the cache data even during the read processing. On the other hand, it is preferable not to perform mirroring of data stored in the cache by the read processing if a communication load between storage nodes is to be suppressed.

Figure 11:
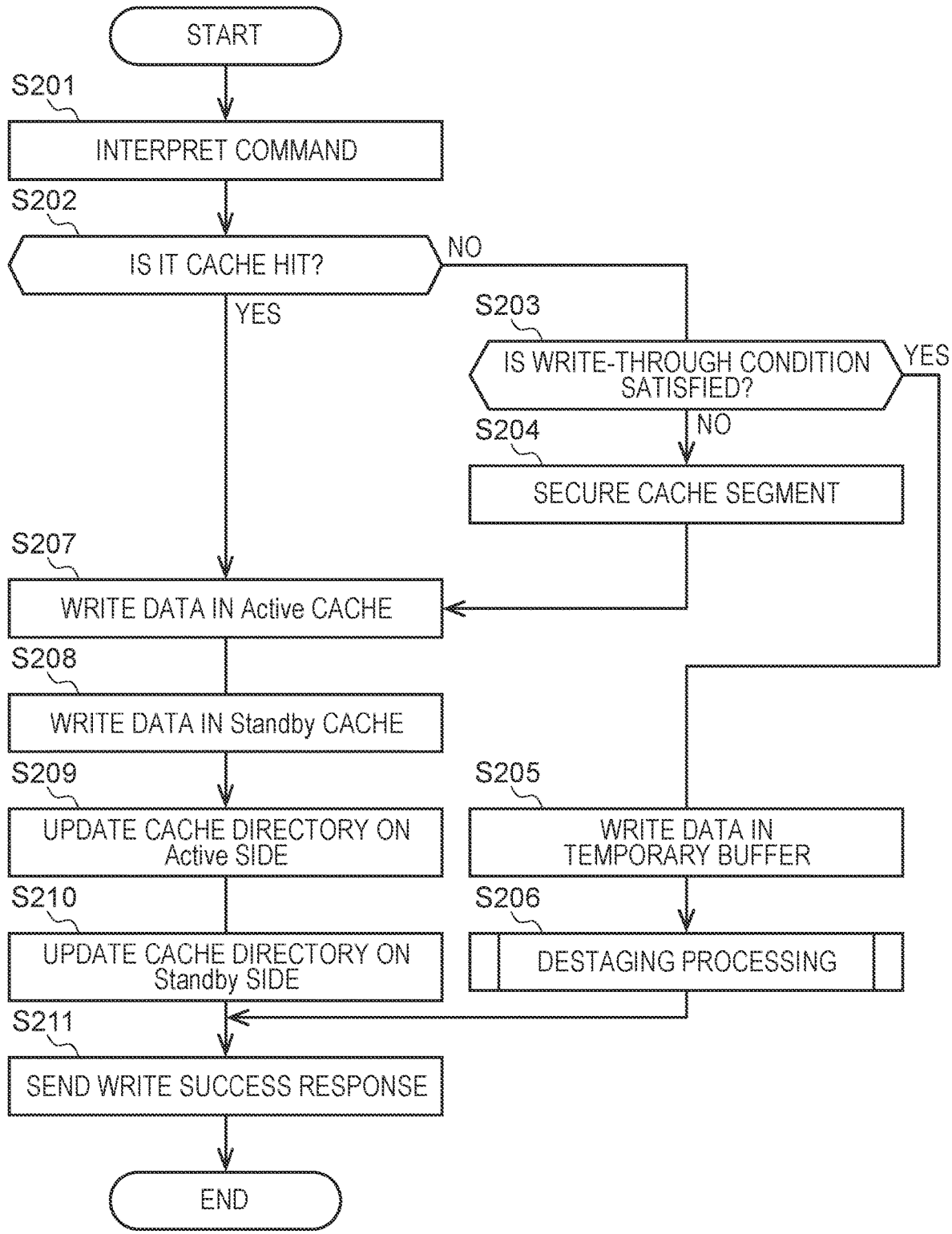
FIG. 11 is a flowchart illustrating write processing.

FIG. 11 is an example of a flowchart illustrating the write processing. The write processing is executed by a storage controller. The storage controller first receives a write command transmitted from a host via a front-end driver, interprets the write command, and obtains a logical volume number and a logical volume address of a write target (step S201). Next, it is determined whether it is a cache hit (step S202). Specifically, a cache directory is referred to, the cache directory is searched for an entry corresponding to the logical volume number and the logical volume address, and a cache address from the entry is referred to if there is the entry (hit), and the processing proceeds to Yes at the branch. Next, data is stored in each of cache areas corresponding to the same storage controller group (in the same nodes as the respective active and standby storage controllers) (step S207 and step S208). Next, an attribute of the entry corresponding to a relevant cache segment is updated to "Dirty" in the cache directories corresponding to the respective cache areas (step S209, step S210). Then, a write success response is sent to the host (step S211).

In the case of a cache miss, the processing proceeds to No at the branch, and it is determined whether a write-through condition is satisfied. If it is not satisfied, the processing proceeds to No at the branch to secure a cache segment, and thereafter, processes in steps S207 to S211 are performed similarly to the case of the hit. That is, if the write-through condition is not satisfied, write-back processing is performed to send a write completion response after performing mirroring of the data in cache memories.

If the write-through condition is satisfied, the data is stored in a temporary buffer (step S205), and the destaging processing to be described later is called. After completion of the destaging processing, the write success response is sent to the host.

In this manner, when the write-through condition is satisfied, write-through processing is performed in which the mirroring of the cache data is not performed between the active and the standby, and writing is performed into a storage device of a storage node in which control software in the active state is arranged and a storage device in which control software in the standby (inactive) state belonging to the same storage controller group, and then, a write completion response is made.

As a result, when the write-through condition is satisfied, the response to the host is delayed, but a network load between the storage nodes can be reduced.

As the write-through condition, for example, the following conditions can be used.

"A communication load between storage nodes exceeds a threshold."

"Data size related to a write request exceeds a threshold."

"A load of a processor executing control software in an active state exceeds a threshold."

"Consecutive write requests have been received."

These conditions may be used alone or in combination.

In addition, it is possible to set any condition without hindering the adoption of conditions other than the examples.

Figure 12:
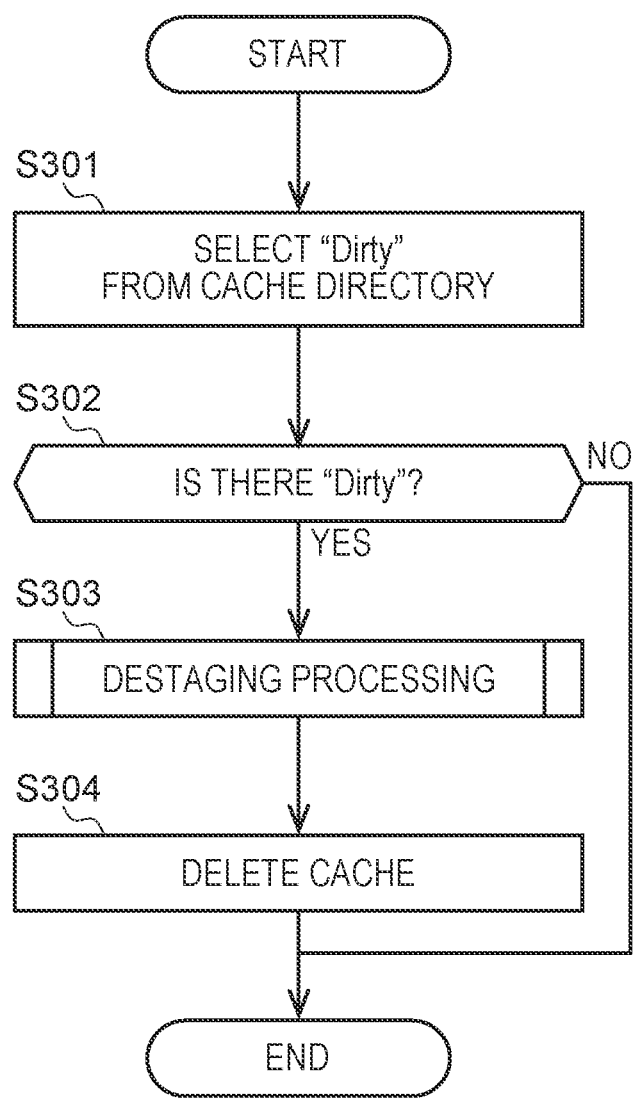
FIG. 12 is a flowchart of asynchronous destaging processing.

FIG. 12 is a flowchart of the asynchronous destaging processing. The asynchronous destaging processing searches a cache directory for an entry whose attribute is "Dirty" (step S301). If there is no such an entry (step S302; No), the processing is directly ended. If there is an entry that is likely to be "Dirty" (step S302; Yes), the destaging processing is performed on a cache segment thereof (step S303), and the entry is deleted from the cache directory after completion of the destaging processing (step S304). This deletion is performed for both an Active cache directory and a Standby cache directory that correspond to the same storage controller group.

Figure 13:
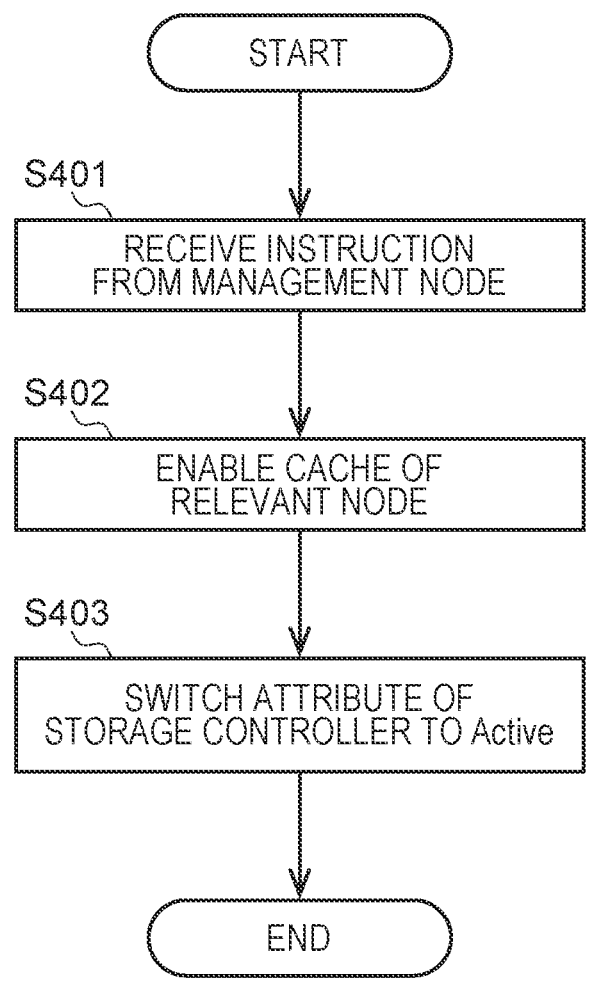
FIG. 13 is a flowchart of failover processing.

FIG. 13 is a flowchart of the failover processing. When a storage node fails, this processing is executed by a storage controller in the standby mode of a storage controller group that has a storage controller in the active mode in the relevant node. First, the relevant storage controller receives an instruction requesting switching to the active mode from the management node 104 (step S401). The storage controller enables a cache of the storage node in which the own storage controller is installed (step S402), changes the mode of the own storage controller from standby to active, and rewrites the storage controller management table (step S403).

Figure 14:
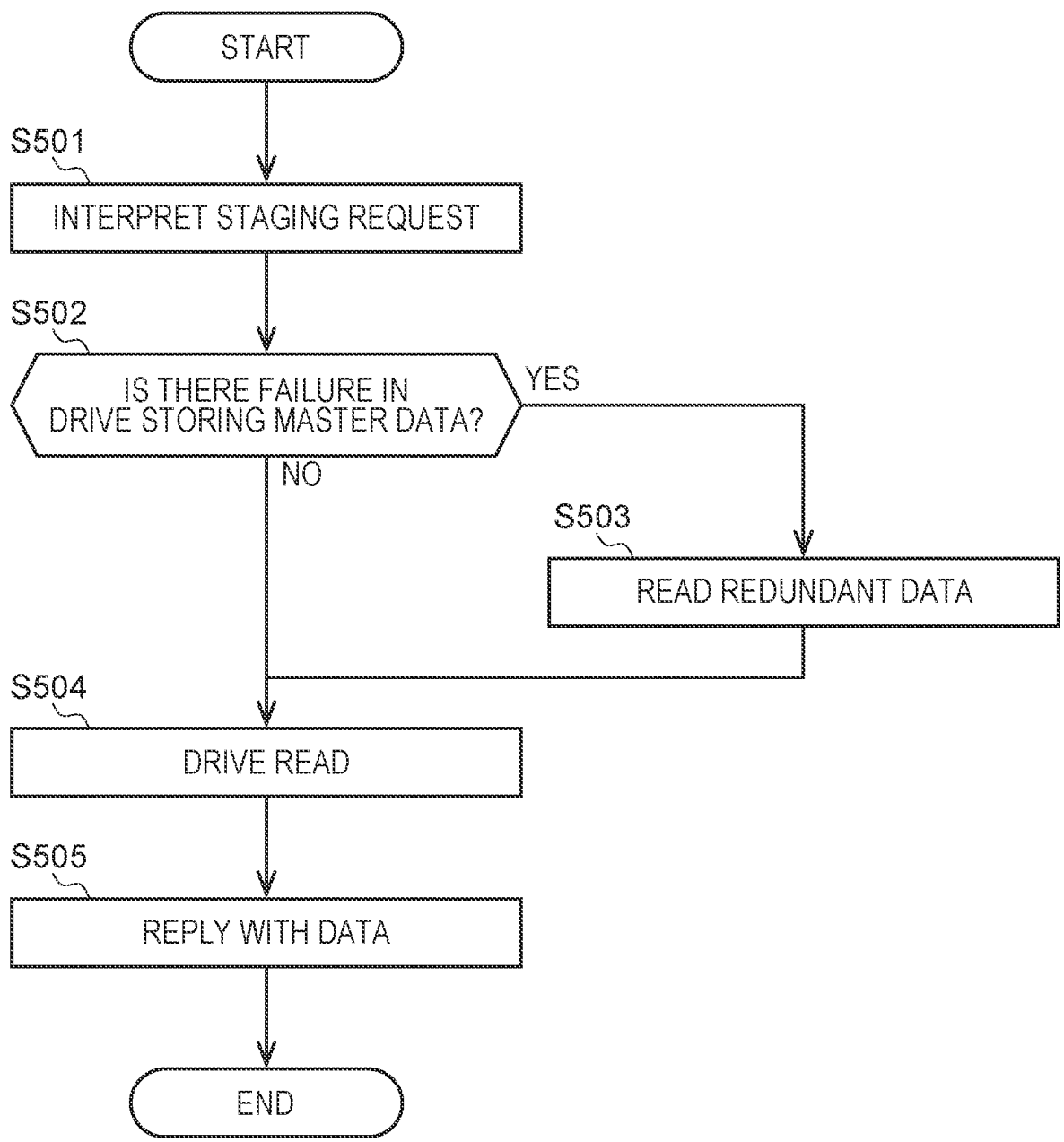
FIG. 14 is a flowchart of staging processing.

FIG. 14 is a flowchart of the staging processing. A staging request passed from a storage controller is interpreted to obtain a logical chunk number and a logical chunk address of a read target (step S501). It is determined whether there is a failure in a drive storing a master physical chunk of the relevant logical chunk (step S502). If there is no failure (step S502; No), data is read from the drive storing the physical chunk (step S504). If there is a failure (step S502; Yes), redundant data is read from another physical chunk forming the logical chunk (step S503), and the data is restored to perform drive read (step S504). Here, the case of protection using EC is illustrated, but a restoration method depends on a data protection method performed by the data protection controller. For example, in the case of protection using mirroring, data may be read from a mirror physical chunk. Thereafter, a storage controller that is a caller receives a response with the data read by either method (step S505).

Figure 15:
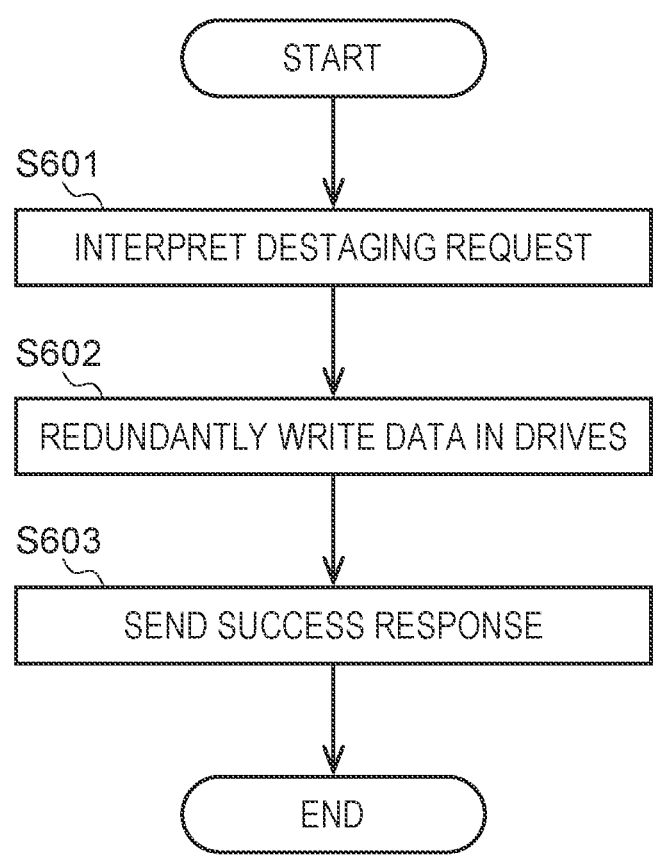
FIG. 15 is a flowchart of destaging processing.

FIG. 15 is a flowchart of the destaging processing. The data protection controller interprets a destaging request passed from a storage controller (step S601) to obtain a logical chunk number and a logical chunk address of a write target. The data protection controller redundantly stores data in a drive using mirroring or EC (step S602) and sends a success response (step S603).

Second Embodiment (1) Second Embodiment

Next, a second embodiment will be described. A difference from the first embodiment is that three storage controllers forming a storage controller group exist, and are arranged in three storage nodes different from each other in the second embodiment.

Figure 16:
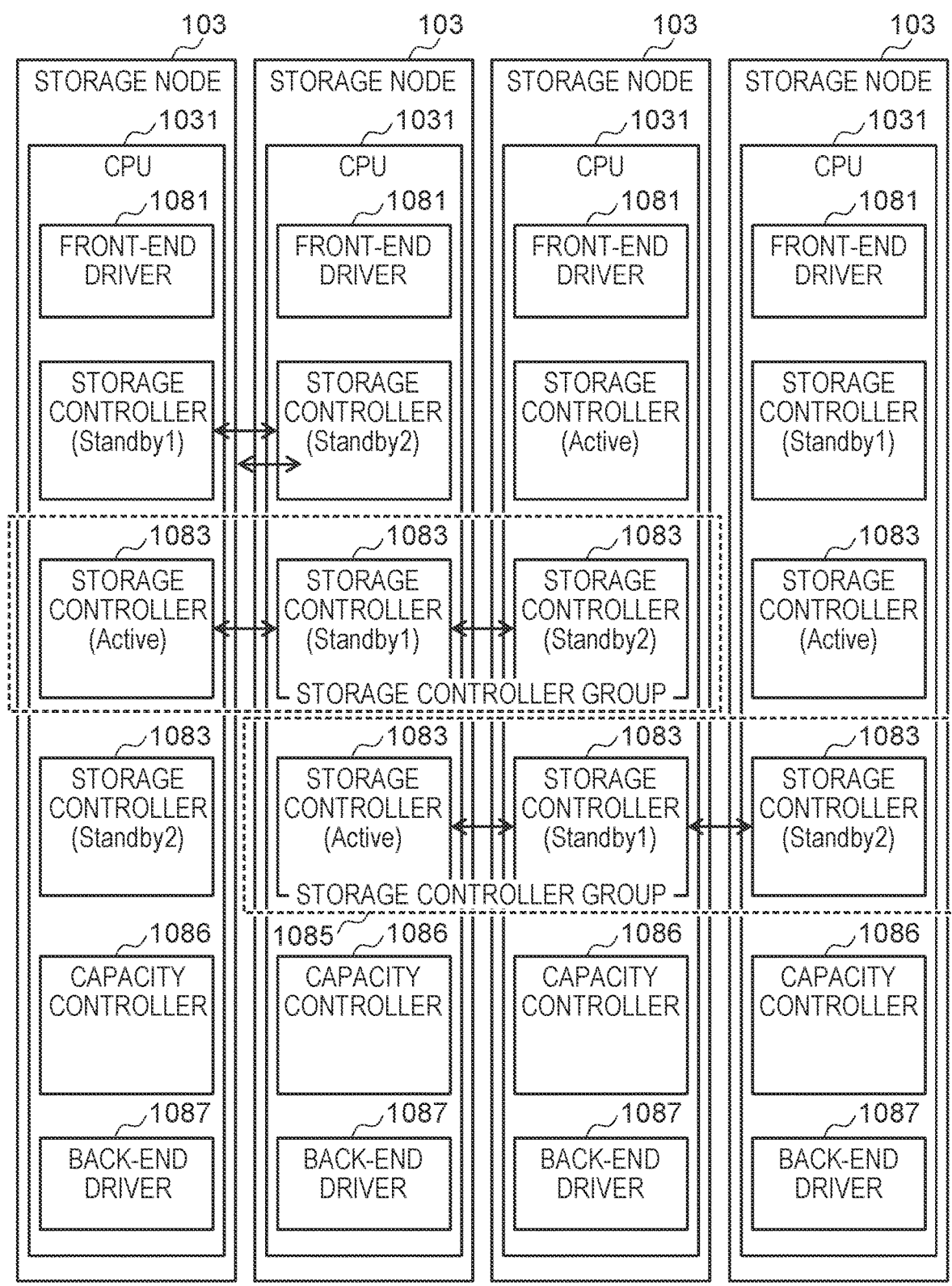
FIG. 16 is a software module diagram according to a second embodiment.

FIG. 16 illustrates a software module diagram of the second embodiment. Three storage controllers are arranged in each storage node, and a storage controller group includes storage controllers arranged in three nodes. One storage controller group includes storage controllers in Active mode, Standby 1 mode, and Standby 2 mode. Since there are two standby storage controllers, even if two storage nodes fail, one safe storage controller always remains in the storage controller group, and thus, access to data can be continued.

Figure 17:
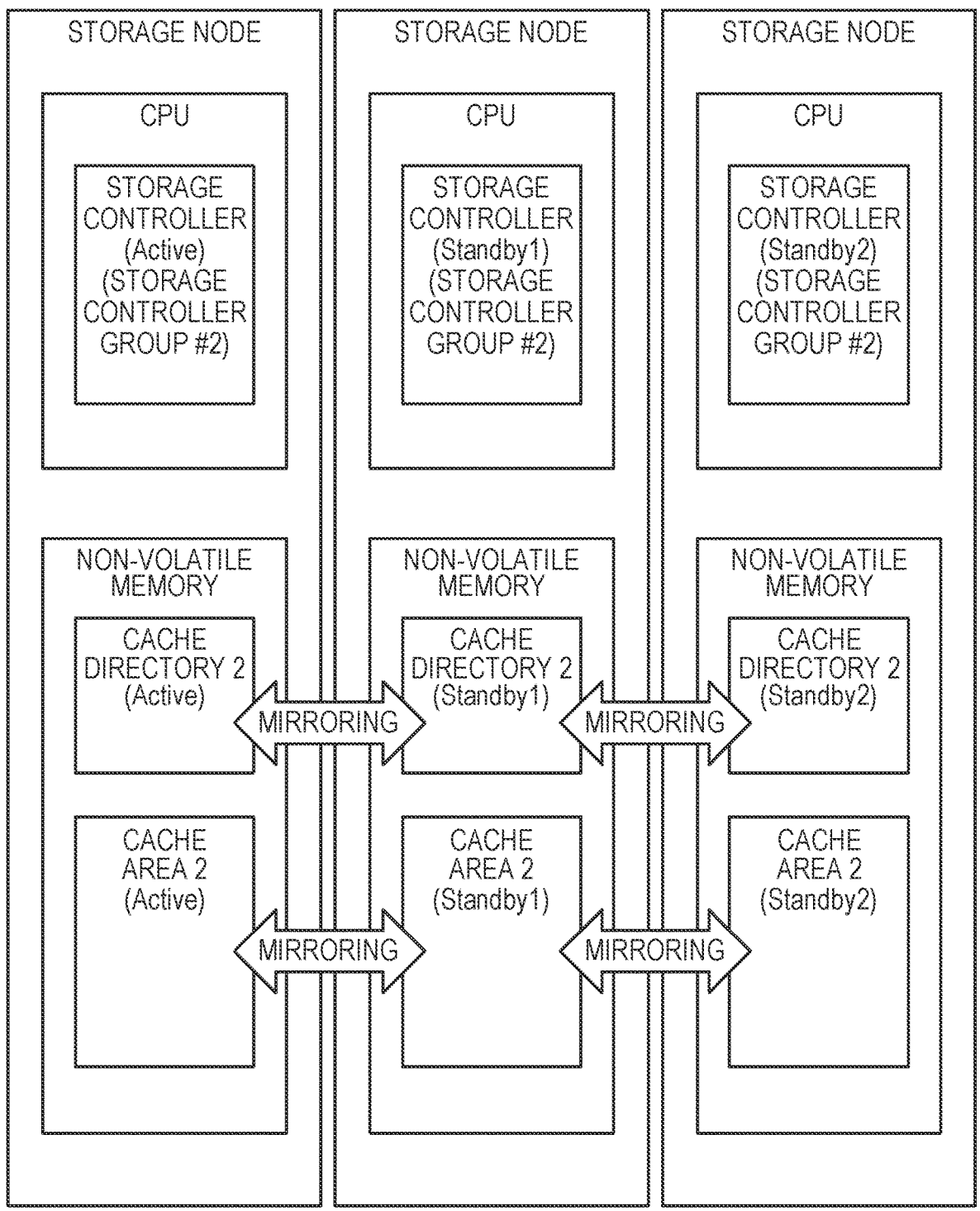
FIG. 17 is a configuration diagram of a non-volatile memory according to the second embodiment.

FIG. 17 is an example of a configuration diagram of a non-volatile memory in the second embodiment. Along with the triplicate storage controller, a cache directory and a cache area on the non-volatile memory are also triplicated.

As described above, the storage systems according to the embodiments of the disclosure correspond to a storage system including: a plurality of storage nodes; and one or a plurality of storage devices each providing a storage area. The storage node includes: one or a plurality of pieces of control software reading and writing requested data from and to a corresponding storage device out of the storage devices in response to a request from a higher-level device; and a cache memory that retains cache data related to the reading and writing. A plurality of pieces of the control software form each of redundancy groups, and pieces of the control software belonging to an identical redundancy group out of the redundancy groups are arranged in the storage nodes different from each other. Control software in an active state, which processes the request from the higher-level device, out of the plurality of pieces of control software forming the redundancy group writes data related to a write request by mirroring into a cache memory of a storage node in which the control software in the active state is arranged and a cache memory of a storage node in which control software in an inactive state belonging to the identical redundancy group is arranged when the write request is received, sends a write completion response to the higher-level device, and redundantly stores the data written in the cache memories in the storage device.

According to the above configuration and operation, it is possible to reply to the host with success by writing into the cache, and writing from the cache into the storage device can be performed asynchronously with the host I/O, and thus, the response performance can be improved.

In addition, the mirroring of the cache enables both the improvement of the host response performance and enhancement of reliability.

In addition, according to the embodiments of the disclosure, the control software in the active state performs write-back processing of sending the write completion response after performing the mirroring of the data of the cache memories when a predetermined condition is not satisfied, and performs write-through processing of sending the write completion response to the higher-level device after performing writing into a storage device of the storage node in which the control software in the active state is arranged when the predetermined condition is satisfied.

Therefore, it is possible to prevent a situation in which a load on a network becomes excessively large due to both the mirroring of the cache and the writing into the storage device.

In addition, according to the embodiments of the disclosure, the control software in the active state can use a condition that a communication load between storage nodes exceeds a threshold as the predetermined condition.

If the above condition is used, the communication load can be suppressed by direct feedback control.

In addition, the control software in the active state can use a condition that a size of the data related to the write request exceeds a threshold as the predetermined condition.

If the above condition is used, it is possible to perform control with the load of the network predicted in advance based on the data size.

In addition, a condition that a load of a processor that executes the control software in the active state exceeds a threshold can be used as the predetermined condition.

In the above condition, a load of the entire system is used as an index indicating the load of the network. Thus, stable control is possible without causing fluctuations of the load as compared with the case of feeding back the load of the network, and it is also effective for control of the own load of the processor itself.

In addition, the control software in the active state can use reception of consecutive write requests as the predetermined condition.

If the above condition is used, it is possible to perform control while predicting a situation in which the mirroring of the cache and the writing into the storage device occur at the same time.

In addition, the redundancy group may include two or more pieces of control software in an inactive state.

In addition, the data stored in the storage device is redundantly stored, and thus, is usable by the control software in the active state and the control software in the inactive state. When the control software in the inactive state is switched to an active state, the data stored in the storage device and a cache data stored by mirroring in the cache memory of the storage node in which the control software is installed can be used for processing of a subsequent request. That is, when a storage node fails, control software arranged in the storage node hands over the processing to another control software in the redundancy group to which the control software belongs. At this time, a cache on a non-volatile memory redundant in the same node is also handed over, and thus, data is not lost even when the storage node fails.

Note that the present invention is not limited to the above-described embodiments, but includes various modifications. For example, the above-described embodiments have been described in detail in order to describe the present invention in an easily understandable manner, and are not necessarily limited to those including the entire configuration that has been described above. In addition, replacement and addition of a configuration are also possible without being limited to deletion of a configuration.

In addition, a part or all of each of the above-described configurations, functions, processing units, processing means, and the like may be realized, for example, by hardware by designing with an integrated circuit and the like. In addition, the present invention can also be realized by a program code of software for realizing the functions of the embodiments. In this case, a storage medium in which the program code has been recorded is provided to a computer, and a processor included in the computer reads the program code stored in the storage medium. In this case, the program code itself read from the storage medium realizes the functions of the above embodiment, and the program code itself and the storage medium storing the program code constitute the present invention. As the storage medium configured to supply such a program code, for example, a flexible disk, a CD-ROM, a DVD-ROM, a hard disk, a solid state drive (SSD), an optical disk, a magneto-optical disk, CD-R, a magnetic tape, a non-volatile memory card, a ROM, or the like is used.

What is claimed is:

1. A storage system comprising:
   a plurality of storage nodes; and
   one or a plurality of storage devices each providing a storage area,
   wherein each of the storage nodes includes:
   one or a plurality of pieces of control software reading and writing requested data from and to a corresponding storage device out of the storage devices in response to a request from a higher-level device, and
   a cache memory that retains cache data related to the reading and writing, wherein
   a plurality of pieces of the control software form each of redundancy groups, and pieces of the control software belonging to an identical redundancy group out of the redundancy groups are arranged in the storage nodes different from each other,
   control software in an active state, which processes the request from the higher-level device, out of the plurality of pieces of control software forming the redundancy group writes data related to a write request by mirroring the data into a first cache memory of a first storage node in which the control software in the active state is arranged and a second cache memory of a second storage node in which control software in an inactive state belonging to the identical redundancy group is arranged when the write request is received, sends a write completion response to the higher-level device, and redundantly stores the data written in the first cache memory in a first storage device of the first storage node and stores data written in the second cache memory in a second storage device of the second storage node, and
   the control software in the active state performs write-back processing of sending the write completion response after performing the mirroring of the data of the first and second cache memories when a predetermined condition is not satisfied, and performs write-through processing of sending the write completion response to the higher-level device after performing writing into the first storage device of the first storage node in which the control software in the active state is arranged when the predetermined condition is satisfied.

2. The storage system according to claim 1, wherein
   the control software in the active state uses a condition that a communication load between storage nodes exceeds a threshold as the predetermined condition.

3. The storage system according to claim 1, wherein
   the control software in the active state uses a condition that a size of the data related to the write request exceeds a threshold as the predetermined condition.

4. The storage system according to claim 1, wherein
   a condition that a load of a processor that executes the control software in the active state exceeds a threshold is used as the predetermined condition.

5. The storage system according to claim 1, wherein
   the control software in the active state uses reception of consecutive write requests as the predetermined condition.

6. The storage system according to claim 1, wherein
   the redundancy group includes two or more pieces of control software in an inactive state.

7. The storage system according to claim 1, wherein
   the data stored in the first storage device is redundantly stored, and thus, is usable by the control software in the active state and the control software in the inactive state,
   when the control software in the inactive state is switched to an active state, the data stored in the second storage device and a cache data stored by mirroring in the second cache memory of the second storage node in which the control software is installed are used for processing of a subsequent request.

8. A data processing method in a storage system in which a plurality of pieces of control software constituting a redundancy group are distributedly arranged in a plurality of storage nodes, the data processing method comprising:
   receiving a write request from a higher-level device by control software in an active state out of the plurality of pieces of control software constituting the redundancy group;
   writing, by the control software in the active state, data related to the write request by mirroring the data into a first cache memory of a first storage node in which the control software in the active state is arranged and a second cache memory of a second storage node in which control software in an inactive state belonging to the same redundancy group is arranged; and
   sending, by the control software in the active state, a write completion response to the higher-level device, and redundantly storing the data written in the first cache memory in a first storage device of the first storage node and stores data written in the second cache memory in a second storage device of the second storage node, and
   the control software in the active state performs write-back processing of sending the write completion response after performing the mirroring of the data of the first and second cache memories when a predetermined condition is not satisfied, and performs write-through processing of sending the write completion response to the higher-level device after performing writing into the first storage device of the first storage node in which the control software in the active state is arranged when the predetermined condition is satisfied.

* * * * *